United States Patent [19]

Bellar et al.

[11] Patent Number: 4,511,986

[45] Date of Patent: Apr. 16, 1985

[54] METHOD AND APPARATUS FOR SIMULTANEOUSLY RECORDING MULTIPLE FT-IR SIGNALS

[75] Inventors: Robert J. Bellar, Watsonville; William G. Golden, San Jose; David D. Saperstein, Foster City; Ashok Vats, San Jose, all of Calif.

[73] Assignee: International Business Machines, Armonk, N.Y.

[21] Appl. No.: 413,034

[22] Filed: Aug. 30, 1982

[51] Int. Cl.$^3$ ............................ G06G 9/00; G01J 3/42
[52] U.S. Cl. .................................. 364/576; 346/33 A; 356/346; 364/485; 364/525
[58] Field of Search ............... 364/484, 485, 498, 576, 364/525; 250/338 R; 356/346; 346/33 A

[56] References Cited

U.S. PATENT DOCUMENTS

| | | | |
|---|---|---|---|
| 3,674,998 | 7/1972 | Benz | 364/498 |
| 3,753,619 | 8/1973 | Thorpe et al. | 356/346 |
| 3,965,477 | 6/1976 | Hambleton et al. | 346/33 A |
| 3,972,618 | 8/1976 | Hawes | 356/106 R |
| 3,973,112 | 8/1976 | Sloane | 364/576 |

Primary Examiner—Gary Chin
Assistant Examiner—Heather Herndon
Attorney, Agent, or Firm—Otto Schmid, Jr.

[57] ABSTRACT

A method and apparatus for simultaneously recording multiple Fourier Transform Infrared (FT-IR) signals using an interferometer. The analog signals are coupled to switching means which is operable in response to a first control signal for synchronizing the operation of the interferometer and the control circuits and a second control signal for defining data acquisition intervals to direct the sampled data of the analog input signals over a circuit path including Sample and Hold and Analog to Digital Conversion circuits to a processor for storing the digital data corresponding to the analog input signals. The switching means is operated so that samples of the analog input signals are taken in sequence and stored in sequential storage locations in interleaved fashion. The processor is operable under program control to access the digital data so that all data samples for the same input signals are separated to produce an interferogram for each of the input signals. These interferograms can then be Fourier Transformed to produce spectra in the usual manner.

7 Claims, 8 Drawing Figures

METHOD AND APPARATUS FOR SIMULTANEOUSLY RECORDING MULTIPLE FT-IR SIGNALS

FIELD OF THE INVENTION

This invention relates to spectroscopy and more particularly to Fourier Transform spectroscopy in which an interferometer is used.

DESCRIPTION OF THE PRIOR ART

Interferometers have been used for many years to measure and to analyze the frequency spectra of electromagnetic radiation. The basic principles and general operation of interferometers for Fourier Transform Infrared (FT-IR) signals are well known, and can be found in many textbooks and review papers on the subject such as the ones written by Bell or Griffiths. It is commonly accepted that in operation an FT-IR Spectrometer records sample and reference data in sequential fashion. While this operation is adequate for most applications, there are some circumstances in which these characteristics present a limitation. For example, under some conditions when a sample spectrum and a reference spectrum are taken sequentially, there is time for experimental conditions to change between their acquisition. This leads to a mismatch between the spectra, and the resultant mathematical combination of the sample and reference spectra is imperfect. Hawes has disclosed and Gomez-Taylor and Griffiths have described an interferometer design which makes possible the acquisition of sample and reference data simultaneously. However, their embodiment, which is optical in design, requires a new instrument which is not readily available and is unuseable with present equipment.

SUMMARY OF THE INVENTION

It is therefore the principal object of this invention to provide apparatus and a method to simultaneously record multiple IR spectral signals using readily available FT-IR instrumentation.

Briefly, according to the invention, there is provided a method and apparatus for simultaneously recording, in a single beam spectrometer, multiple signals defining at least two different interferograms. The apparatus comprises switching circuit means having at least two signal terminals, a first and a second control circuit input terminal and an output terminal. A Sample-and-Hold (S&H) circuit is connected between the output terminal of the switching means and the input terminal of an Analog-to-Digital Converter (ADC). A first control signal is provided for synchronizing the operation of the interferometer and the control circuits and a second control signal is operable to define data acquisition intervals. The first control signal is coupled to the first control circuit input terminal of the switching circuit means to reset the switching circuit means to a predetermined state. The second control signal is coupled to the second control circuit input terminal to switch the state of the switching circuit means for each of the signal defining intervals so that the data samples for each of the input signals are interleaved. Computing circuit means is provided to receive the digital data from the ADC and store this data. The computing circuit means is then operable under program control to access the digital data so that all data samples for the same input signals are combined to produce an interferogram for each of the input signals.

According to a specific embodiment, the switching circuit means comprises essentially a double-pole-double-throw circuit arrangement followed by a single-pole-double-throw circuit arrangement. In this embodiment, the digital data is stored in odd and even storage locations in a split form and the digital data is recombined under program control in accordance with the algorithm expressible as the sum of the Even 1st and the Odd 2nd divided by the sum of the Even 2nd and the Odd 1st or $(E1+O2)/E2+O1$

DESCRIPTION OF THE PREFERRED EMBODIMENT

Our invention provides apparatus and a method for simultaneously recording multiple Fourier Transform Infrared (FT-IR) signals. The apparatus and method require an interferometer. In the following description, a Michelson type interferometer is chosen for purposes of example, but it will be understood that the specific example is not intended to constitute a limitation on the general utility of the invention.

Figure 1:
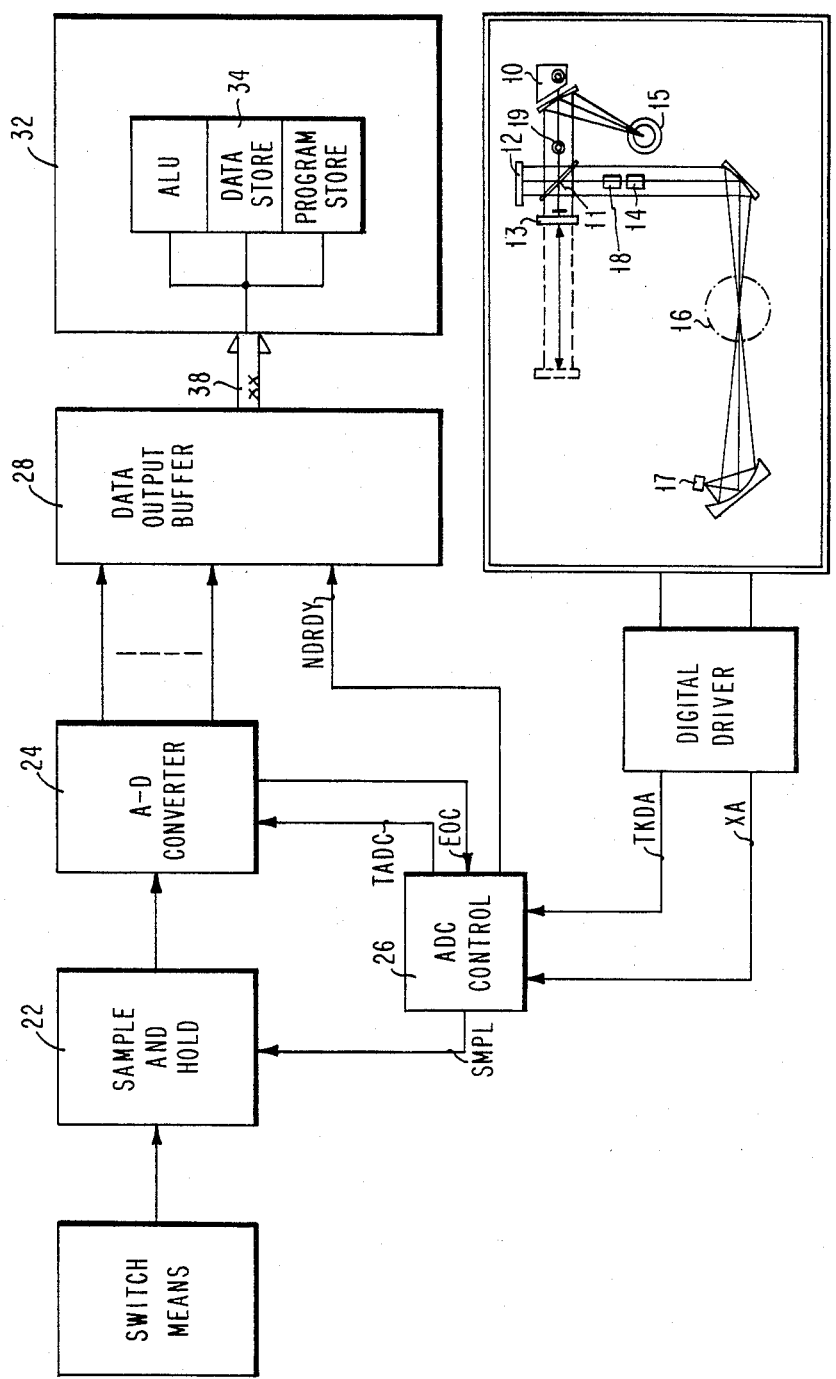
FIG. 1 is a schematic block diagram of a Fourier Transform Infrared Spectroscopy system embodying the present invention.
Figures 2, 3:
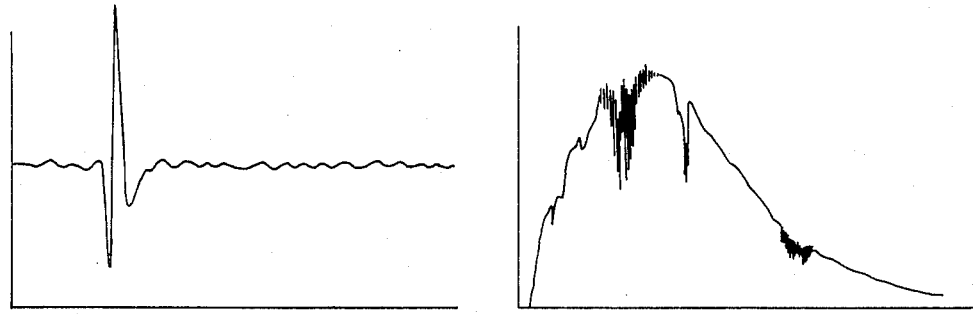
FIG. 2 is a plot showing a typical interferogram produced by the system of FIG. 1.
FIG. 3 is a plot showing the spectrum of the interferogram shown in FIG. 2.
Figure 8:
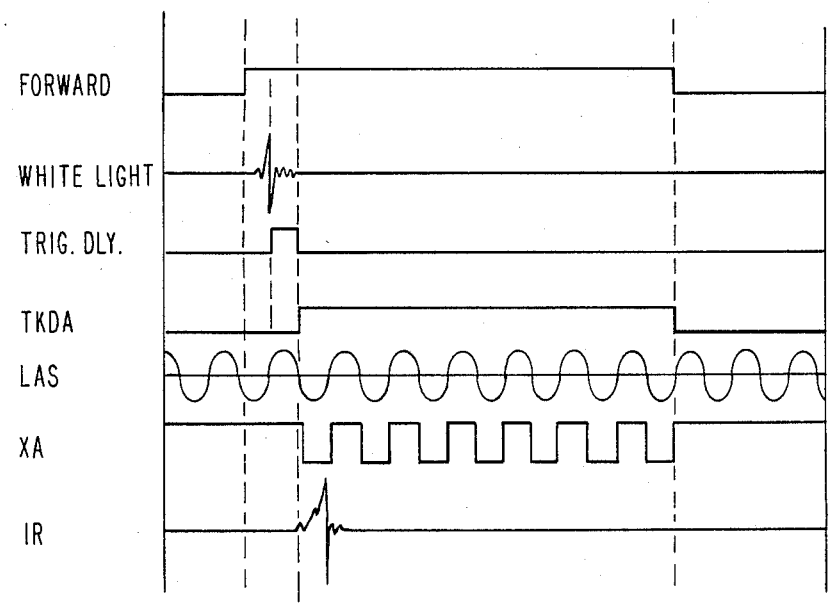
FIG. 8 is a timing diagram showing the signals generated to synchronize the interferometer operation with the associated control circuits.

The interferometer operation is well known, so the operation will not be described in detail. Referring to FIG. 1, a reference laser 10 produces coherent radiation which is directed to beam splitter 11 where it is split into two beams. Each beam half is directed to one of the mirrors 12, 13. Mirror 12 is fixed in position, and mirror 13 is moveable along a linear path so that the optical path including moveable mirror 13 has a variable path length (shown dotted in FIG. 1). Each beam half is reflected from the appropriate mirror 12 or 13 back to beam splitter 11 where the beams interfere to form a composite beam which is a function of moveable mirror 13 position. The composite beam is directed to laser detector 14 which converts the beam into an electrical signal. This signal LAS (see FIG. 8) has the form of a sinewave and has zero intensity at fixed distances, so called zero crossings, of half multiples of the reference laser wavelength. A digital signal XA (see FIG. 8) is derived from these zero crossings which provides the basic timing for the End of Conversion (EOC) digital signal which defines the data acquisition intervals. A white light source 19 is directed over the same optical path including beam splitter 11, fixed mirror 12 and moveable mirror 13. The interference pattern is detected by white light detector 18. The center burst (largest amplitude) of the output of the white light detector 18 is used to generate the digital signal Take Data (TKDA) (see FIG. 8) which serves to synchronize the interferometer operation with the associated control circuits. Infrared radiation from a broadband source 15 is directed along a path to beamsplitter 11, traverses the interferometer, and is directed to a sample chamber 16 and to an infrared detector 17. The infrared detector detects the radiation intensity. The detector output signal is therefore a measure of the incident intensities of all spectral components and the detector spectral responsivity. The detector signal amplitude as a function of the optical path difference is called an interferogram, and an example of one interferogram is shown in FIG. 2. An additional IR interferogram is shown in FIG. 8 which is greatly compressed in scale relative to the other signals shown there. The interferogram contains the modulated components of the detected IR radiation and is related to the spectrum via the process of Fourier Transformation.

In practice, the analog IR interferogram signal is sampled at equal distances derived from the laser signal XA and is transferred to a processor in digitized form. If necessary, the signal-to-noise ratio of the digital data is increased by coherently adding amplitudes of many interferograms. The digitized data are stored in the processor storage until all the signals for an interferogram are received by the processor. Once data collection is completed, the digitized data is operated on by means of a suitable algorithm to produce the IR spectrum of interest. In the art the process is known as the Fourier Transform. In this disclosure Fourier Transform is meant to include the combination of apodization, fast Fourier transformation, and phase correction to produce an IR spectrum from a given interferogram. The spectrum of the interferogram of FIG. 2 is shown in FIG. 3. A spectrum obtained in such a manner contains the data of interest along with unwanted spectral features of the IR source 15, the interferometer components 11–14, sample chamber 16 and detector 17. These unwanted spectral features can be removed via a ratio with a suitable reference. Usually the reference is a spectrum of the instrument without the sample, recorded sequentially to the sample spectrum.

The prior art systems are operable to produce a spectrum from a single signal source as described above. In some cases in which sample and reference spectra are taken sequentially, there is sufficient change in experimental conditions so that comparison of the sample and reference spectra is imperfect. To correct this problem, applicants have developed a method and apparatus to simultaneously record multiple FT-IR signals.

Figure 4:
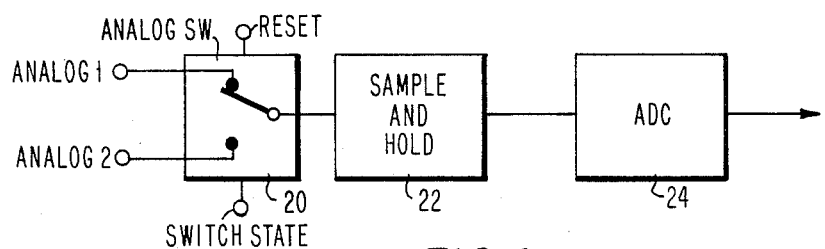
FIG. 4 is a schematic diagram showing a first embodiment of switching means for the present invention.

A specific embodiment of a switching circuit which permits two spectra to be recorded substantially simultaneously is shown in FIG. 4. The two signals ANALOG 1 and ANALOG 2 are coupled to an analog switch 20, which is reset at the beginning of each scan by the signal TKDA which is coupled to the reset terminal of analog switch 20. The signal Take Data (TKDA) goes high at a precise time for each scan start. A scan is defined as the sequence of movement of moveable mirror 13 from the full line to its dotted line position. The signal FORWARD (FIG. 8) is generated by a sensor (not shown) which detects when moveable mirror 13 has returned to the full line position shown in FIG. 1. The TRIGGER DELAY is a setting under control of the operator so that the precise timing of TKDA can be set in this manner as shown in FIG. 8.

Figure 6:
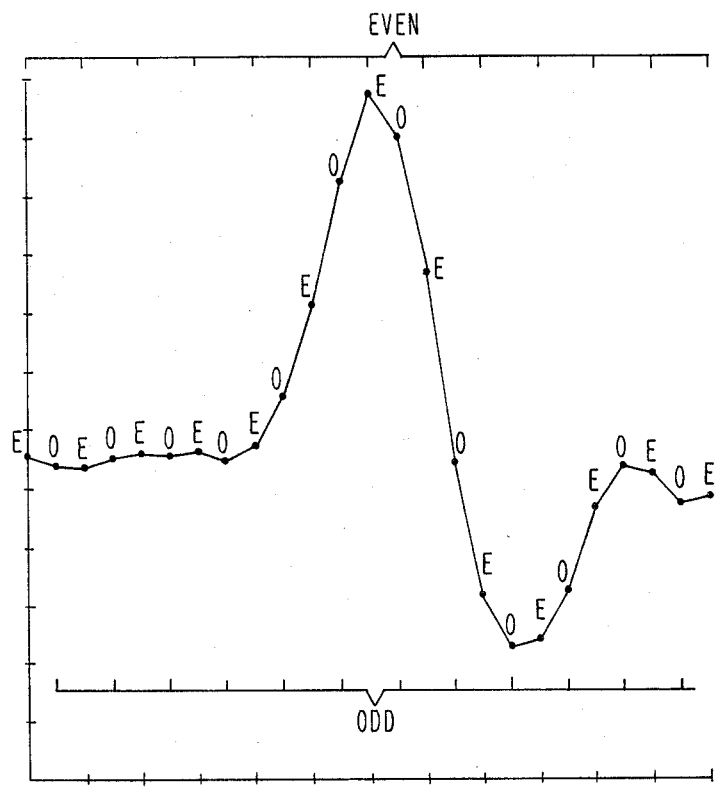
FIG. 6 is a plot showing digitized interferogram points for two signals in accordance with the present invention.

The ANALOG 1 and ANALOG 2 signals are alternately coupled to Sample and Hold (S&H) circuit 22 by means of the End of Conversion (EOC) signal coupled to the SWITCH STATE input terminal of analog switch 20. The output of S&H circuit 22 is coupled to the Analog to Digital Converter (ASC) 24 to digitize the analog signal under control of ADC control 26 (FIG. 1). The output of ADC 24 is temporarily stored in Data Output Buffer 28, and at the appropriate time is coupled over channel 38 to Processor 32 under control of the signal NDRDY. Since an EOC pulse corresponds to each data point taken, the resulting interferogram is composed of alternately DIGITIZED ANALOG 1 and DIGITIZED ANALOG 2 data. As shown in FIG. 6, the data points are digitized and stored in sequential storage locations. The digitized data points for the ANALOG 1 signal are stored in the odd storage locations as shown in FIG. 6, and the digitized data points for ANALOG 2 are stored in the even storage locations. The digitized signals corresponding to the data points of the ANALOG 1 and ANALOG 2 data are stored in processor data storage means 34 in sequential storage locations. Once a set of data points completed, a program to split the even and odd points is executed by the processor. Following this program, the Fourier Transform of the stored interferograms is executed to produce the respective spectra by accessing the data stored in odd storage locations for the DIGITIZED ANALOG 1 interferogram and by accessing the data stored in even storage locations for the DIGITIZED ANALOG 2 interferogram. The embodiment shown in FIG. 4 has been shown to provide the spectra of two signals recorded simultaneously as described above.

Figure 5:
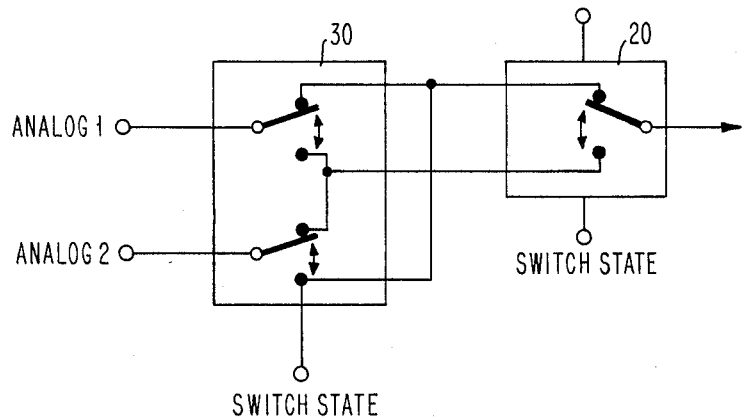
FIG. 5 is a schematic diagram of a second embodiment of switching means for the present invention.

The embodiment shown in FIG. 5 represents a further refinement in the switching circuit that permits more accurate spectra to be obtained in most cases in which two spectra are obtained simultaneously. In the embodiment described above, in the course or running tests in which the two signals are equal, it was noted that the even and odd interferograms have slightly different amplitudes because of digitization. To produce greater accuracy on the computed spectra, two separate scans are taken so that DIGITIZED ANALOG 1 goes into the odd storage locations in the first scan, but into even storage locations in the second scan. In the embodiment shown in FIG. 5, a double-pole double-throw (DPDT) analog switch 30 is coupled to receive the two input signals ANALOG 1 and ANALOG 2. The analog switch 30 is coupled to analog switch 20 so that in a first position the ANALOG 1 signal is coupled to analog switch 20 in its RESET state (as shown in FIG. 5). The signal TKDA is coupled to the SWITCH STATE input of analog switch 30 to change the switch to a second state (opposite to that shown in FIG. 5) in which the ANALOG 2 input is coupled to analog switch 20 in its RESET state (as shown in FIG. 5). It can be seen that when switch 30 is in the RESET position, the DIGITIZED ANALOG 1 signals are stored in a first data file in the odd storage locations and the DIGITIZED ANALOG 2 signals are stored in the even storage locations. However, during the next scan, switch 30 is changed to its second state and in this case the DIGITIZED ANALOG 2 signals are stored in odd storage locations and the DIGITIZED ANALOG 1 signals are stored in even storage locations in a second data file determined prior to data collection.

During data collection, two full interferograms are collected and stored separately. In this present embodiment, when switch 30 is in its first state (shown in FIG. 5), interferogram one is recorded and when switch 30 is in state 2 interferogram two is recorded. For purposes of signal averaging, the data address to store the interferograms is changed so that interferogram one is always stored and co-added with interferogram one data and interferogram two is always stored and co-added with interferogram two data collected previously. Thus, in order to take full advantage of one double switch, software to handle the separate interferograms must be available. One such program is called COLLECT DUAL which collects interferograms into two storage disk files in an alternating fashion.

The software control required to convert the interferograms according to the embodiment of the switching circuits shown in FIG. 5 is somewhat different than that previously described. In this case Let: $E1$ = even spectrum from 1st full interferogram (ANALOG 2)

$O1$ = odd spectrum from 1st full interferogram (ANALOG 1)

$E2$ = even spectrum from 2nd full interferogram (ANALOG 1)

$O2$ = odd spectrum from 2nd full interferogram (ANALOG 2)

By manually switching inputs for each TKDA signal, with the apparatus shown in FIG. 4, two separate full (unsplit) interferograms are acquired in which $E1 = O2$ (ANALOG 2)

and $O1 = E2$ (ANALOG 1)

(i.e. the analog signals have been switched between scans so that DIGITIZED ANALOG 1 is odd in the first full interferogram but even in the second). The circuit described in FIG. 5 eliminates the manual switching.

Then, in order to compensate for the amplitude differences between even and odd spectra, while still maintaining the desired ratio of data, the following operation is performed by the data handling routines:

$$\frac{E1 + O2}{E2 + O1} = \text{desired result} = \frac{\text{ANALOG 2}}{\text{ANALOG 1}}$$

In the situation in which ANALOG 1=ANALOG 2, excellent 100% lines are manifest which are much better than the simpler, single switch approach.

Thus, even in situations where the information in ANALOG 1 and ANALOG 2 is not the same, we can ratio even and odd spectra faithfully by the embodiment of the switching means shown in FIG. 5.

Figure 7:
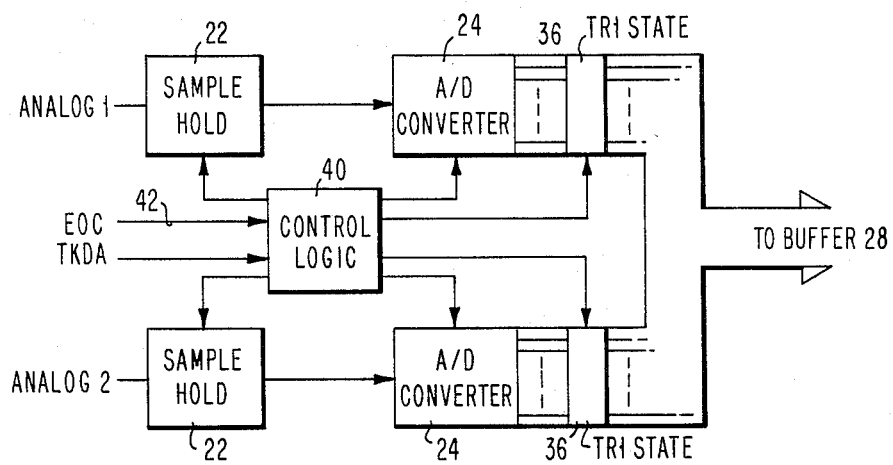
FIG. 7 is a schematic block diagram of a third embodiment of switching means for the present invention which utilizes digital circuitry.

The switching can be done in a digital fashion in the embodiment shown in FIG. 7. In this embodiment the ANALOG 1 signal is coupled into a first S&H circuit 22, the output of which is coupled to an ADC 24. The output of ADC 24 is coupled to a series of tri state devices 36 and the output of devices 36 is gated on to channel 38 for transmission to processor 32. A similar path is provided for the ANALOG 2 signal. Control logic 40 provides control signals to direct the conversion of the appropriate one of the input signals according to the chosen control method. In the FIG. 7 embodiment, at the start of a scan, control logic 40 is reset to a predetermined state by the signal TKDA so that control logic 40 is operable in response to the first EOC pulse received on input line 42 to energize the S&H 22 and ADC 24 for the ANALOG 1 signal. Once the conversion is completed, the appropriate tri-state devices are energized to gate the digital data to channel 38 for transmission to processor 32. On the next EOC pulse, control logic 40 is operable to energize the S&H 22 and ADC 24 for the ANALOG 2 signal. Thus it can be seen that the digitized signals are directed to sequential storage locations in processor 32 with the DIGITIZED ANALOG 1 signals stored in even storage locations and DIGITIZED ANALOG 2 signals stored in odd storage locations.

Specific embodiments of the invention have been described in detail. However, these specific examples are by way of example and are not intended as a limitation of the invention. In particular, although only two analog input signals are described in the specific embodiment, more than two analog input signals can be accommodated. In addition, a specific signal to control RESET was described, but other signals may be used as well including end of scan, mirror reverse, forward or start of scan, and start of Take Data. The switching can be controlled by any reference laser derived signal that is not concurrent with or immediately preceding data sampling by the sample and hold circuitry. This apparatus and method works equally well with Non-FT-IR derived signals as it does with FT-IR spectroscopically derived signals. Such signals may relate to the state of the sample such as temperature, pressure or mass spectrum. In addition, other mathematical techniques may be used for eliminating digital switch-related artifacts including manipulation of interferograms, changes in phase correction methodology and multiplicative methods for correcting spectra.

Having thus described our invention, what we claim as new, and desire to secure by Letters Patent is:

1. Apparatus for simultaneously recording, in a single beam Fourier Transform Infrared spectrometer, multiple signals defining at least two different interferograms comprising:

switching circuit means having at least two signal terminals, having a first and a second control circuit input terminal and having one output terminal;

means for coupling input signals to said at least two signal terminals;

sample-and-hold circuit means having an input terminal connected to the output terminal of said switching circuit means;

analog-to-digital circuit means having an input terminal connected to said sample-and-hold circuit means and having an output terminal for delivering digital data;

means for generating a first control signal for synchronizing said switching circuit means with an interferometer operation;

means for generating a second control signal defining data acquisition intervals;

means for coupling said first control signal to said first control circuit input terminal to reset said switching circuit means to a predetermined state;

means for coupling said second control signal to said second control circuit input terminal to switch the state of said switching circuit means for each of said signals defining data acquisition intervals so that data samples for each of said input signals are interleaved;

computing circuit means coupled to receive the digital data from the output terminal of said analog-to-digital circuit means, said computing circuit means being operable under program control to store said digital data, and for accessing said digital data so that all data samples for the same input signal are combined to produce an interferogram for each of the input signals.

2. The apparatus of claim 1 wherein said switching circuit means comprises a signle-pole-double-throw circuit arrangement.

3. The apparatus of claim 1 wherein said switching circuit means comprises digital circuit means.

4. The apparatus of claim 1 wherein said switching circuit means comprises a double-pole-double-throw circuit arrangement followed by a single-pole-double-throw circuit arrangement.

5. The apparatus of claim 4 wherein said digital data for each interferogram is stored in a first and a second data file and wherein the data in said first and said second data files is recombined under program control in accordance with an algorithm expressible as the sum of an Even 1st and an Odd 2nd divided by the sum of an Even 2nd and an Odd 1st or (E1+O2)/E2+O1 in notation.

6. A method for simultaneously recording, in a single beam Fourier Transform Infrared spectrometer, multiple signals defining at least two different interferograms, said spectrometer comprising circuit means including at least two signal terminals, first and second control circuit input terminals, and switching circuit means;

sample-and-hold circuit means; and analog-to-digital conversion circuit means having an output terminal for delivering digital data;

said method comprising the steps of:

coupling input signals to said at least two signal terminals;

generating a first control signal for synchronizing said circuit means with an interferometer operation;

generating a second control signal defining data acquisition intervals;

coupling said first control signal to said first control circuit input terminal to reset said switching circuit means to a predetermined state;

coupling said second control signal to said second control circuit input terminal to switch the state of said switching circuit means for each of said signal defining data acquisition intervals so that data samples for each of said input signals are interleaved;

storing the digital data from the output terminal of said analog-to-digital circuit means, and accessing said digital data in an order so that all data samples for the same input signal are combined to produce an interferogram for each of the input signals.

7. The method of claim 6 wherein said storing step includes storing said digital data for each interferogram in a first and a second data file and wherein said accessing step includes recombining the digital data in said first and said second data files under program control in accordance with an algorithm expressible as the sum of an Even 1st and an Odd 2nd divided by the sum of an Even 2nd and the Odd 1st or (E1+O2)/E2+O1 in notation.

* * * * *